S. F. BOWMAN.
FILTER.
APPLICATION FILED AUG. 7, 1915.
1,190,979.
Patented July 11, 1916.
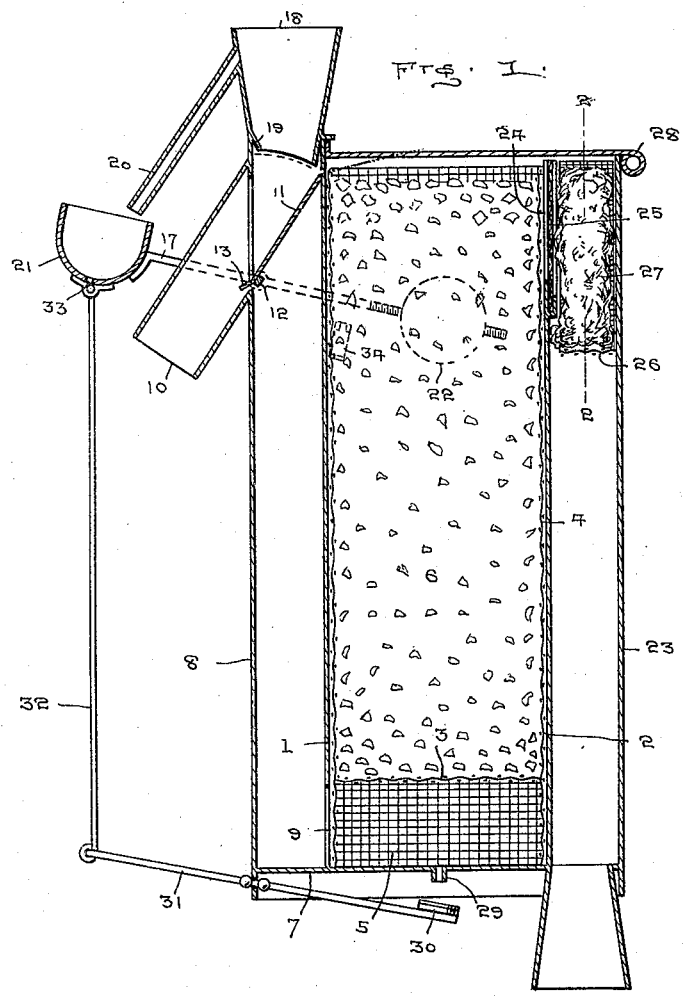
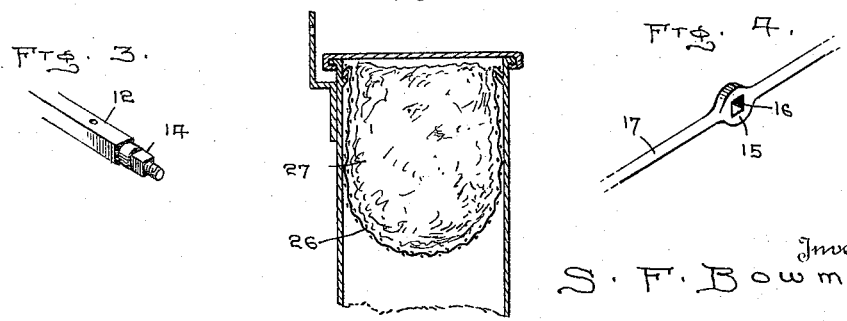
Witnesses
Thos. W. Riley
C. S. Frye
Inventor
S. F. Bowman
By W. J. FitzGerald
Attorney

UNITED STATES PATENT OFFICE.

SAMUEL F. BOWMAN, OF KANSAS CITY, MISSOURI.

FILTER.

1,190,979.  Specification of Letters Patent.  Patented July 11, 1916.

Application filed August 7, 1915. Serial No. 44,168.

*To all whom it may concern:*

Be it known that I, SAMUEL F. BOWMAN, a citizen of the United States, residing at Kansas City, in the county of Jackson and State of Missouri, have invented certain new and useful Improvements in Filters; and I do hereby declare the following to be a full, clear, and exact description of the invention, such as will enable others skilled in the art to which it appertains to make and use the same.

My invention relates to new and useful improvements in filters and more particularly to that class adapted to be used for filtering rain water previous to its entrance into a cistern, and my object is to provide means for automatically opening and closing a valve for excluding the water from the filter or permitting the same to enter therein.

A further object is to provide a suitable filtering medium for clarifying water in passing through the filter.

A further object is to provide means for automatically draining the filter. And a further object is to provide means whereby the filtering medium may be removed for cleansing purposes.

Other objects and advantages will be hereinafter set forth and more particularly pointed out in the accompanying specification.

In the accompanying drawings which are made a part of this application. Figure 1 is a vertical transverse sectional view through the filter. Fig. 2 is a detail sectional view of one portion of the filter. Fig. 3 is a detail sectional view of one end of the valve stem, and Fig. 4 is a detail perspective view of the operating rod connected with said valve stem.

Referring to the drawings in which similar reference numerals designate corresponding parts throughout the several views, 1 indicates a hollow casing interiorly of which is positioned a filtering cage 2, said cage being preferably formed of mesh wire and extended substantially the full height of the casing, the lower portion of the cage having a partition wall 3 to form an upper and lower compartment 4 and 5 in the filtering cage, the compartment 5 being preferably left empty, while the compartment 4 is filled with charcoal or similar filtering medium 6. Extending upwardly from the bottom 7 of the casing 1 and along one face thereof is a tube 8 through which water descends when being entered into the filter. An opening 9 is formed in the wall of the casing in registration with the compartment 5 and as the water descends directly from the roof of the building into the filter, the mesh wire forming the compartment 5 will remove the larger foreign particles from the water.

Adjacent the upper end of the tube 8 is formed a bypass 10 through which the water may be diverted from the filter, a valve or gate 11 being provided at this point for controlling the movement of the water through the tube and bypass. The lower end of the valve is fixed to a stem 12 which is pivotally mounted in the walls of the tube adjacent the connection of the tube and lower edge of the bypass, the lower edge of the valve being provided with an inclined extension 13 which overlaps the junction point between the lower edge of the bypass and tube. One end of the stem 12 projects beyond the wall of the tube 8 and a portion thereof is squared, as indicated at 14, said squared portion being adapted to receive a socket 15 having a square opening 16 therein, of a valve operating rod 17, and when said rod is tilted the valve will be directed over the inner end of the bypass or across the opening in the tube, thereby controlling the movement of the water through these parts.

At the upper end of the tube 8 is a flared extension 18 into which the water is discharged from the down spout of a building, the lower end of the extension having an inwardly and downwardly extending flange 19 below which the upper end of the valve 11 seats when positioned over the mouth of the bypass, said flange slightly restricting the passage of the water through the extension sufficiently to cause the water to arise in the extension and overflow into a spout 20 communicating with the extension adjacent its upper edge, the water thus passing through the spout 20 entering a trough or cup 21 fixed to one end of the valve operating rod 17, the accumulation of the water in said trough causing the trough to move downwardly to swing the valve to position over the mouth of the bypass. The amount of water required in the trough to operate the valve is determined by means of a counter balance weight 22 which is threaded on the opposite end of the valve operating rod 17, so that by adjusting said weight inwardly or outwardly, the amount of water required to lower the trough will be accordingly decreased or increased. On the opposite side of the casing 1 is provided an escape tube 23, through which the water passes from the filtering compartment into a cistern, the upper end of the wall of the casing adjacent the escape tube having an opening 24 and over this opening is removably secured a fine mesh screen 25, and immediately beyond the mesh screen and secured in the upper end of the escape tube 23 by means of a wire basket 26 is a sponge 27, said sponge completing the removal of any foreign particles that might be contained in the water and not removed by the charcoal and fine mesh screen. A lid 28 is positioned over the upper end of the casing 1 and escape tube 23 so that ready access may be had to the interior of the casing to remove the basket 26 and filtering cage 2 for cleaning purposes.

In order to thoroughly drain the casing when not in use, the bottom 7 is provided with a port 29 through which the water can drain from the casing, and in order to automatically close said port when the filter is in use, a valve 30 is secured to one end of a shaft 31 which shaft is pivoted adjacent its longitudinal center to the bottom portion of the casing, the outwardly extending end of the shaft being attached to the trough 21 through the medium of a rod 32, and it will be readily seen that as the trough descends to open the valve 11, downward pressure will be directed against the outer end of the shaft 31 which will result in swinging the valve 30 to closed position over the end of the port 29, and said valve will remain in closed position so long as the trough is in its lowered position.

The valve or gate 11 is caused to rest in an open position or across the mouth of the inlet tube 8 at all times when the filter is not in use, so that the first water that enters the extension will pass outwardly through the bypass 10, thus preventing the dirt, etc., collected upon the roof from entering the filter and as it requires some little time for a sufficient amount of water to pass through the spout 20 to fill the trough, the foul water will have all passed to the exterior of the filter before the valve is opened. The bottom portion of the trough 11 is provided with a small seep hole 33 so that the water will slowly drain from the trough and thus permit the weight to swing downwardly and dispose the valve over the mouth of the inlet tube after the water has ceased to enter the extension 18.

If the cistern is sufficiently filled with water and it is not desired to introduce any more therein, any suitable form of lock 34 carried by the housing, is engaged with the weighted end of the valve operating rod 17, thus holding the gate 11 in position to exclude the water from the inlet tube 8 regardless of the amount of water entering the trough 21.

In applying the filter to use, the open end of the extension 18 is placed below the end of the usual form of down spout, so that the water from the roof will pass directly into the extension, and in view of the fact that the roof and gutters usually accumulate considerable dust, leaves and other foreign particles, the first flow of water from the roof is carried through the bypass 10, the flow of water continuing through the bypass until a sufficient amount of water has passed through the spout 20 into the trough 21 to tilt the trough downwardly. As this operation requires considerable time, the roof and gutters are cleared of the major portion of the foreign particles before the valve 11 opens to admit the water into the inlet tube 8. As the trough 21 tilts downwardly, the valve 11 is swung into vertical position and over the mouth of the bypass 10 directing the water downwardly into the inlet tube 8, through the opening 9 into the filtering chamber, from whence it passes through the mesh wire 5, upwardly through the charcoal 6, through the screen 25 and sponge 27, this operation thoroughly cleansing the water of the foreign particles before it descends into the outlet tube 23 into the cistern. Should the filtering medium become foul or filled with foreign particles, the cover 28 is removed from over the casing 1 and the sponge 27 and cage 2 removed from their respective positions and thoroughly cleansed of all the foreign particles. It will also be seen that as soon as the flow of water into the extension ceases and the water is drained from the trough 21, the weight 22 will swing the trough upwardly and throw the gate 11 across the path of the inlet tube 8, this operation removing the valve 30 from engagement with the port 29 and permitting any water that may remain in the filter to drain therefrom, thus preventing the water from freezing in the filter.

Having thus fully described my invention what I claim as new and desire to secure by Letters Patent is:—

1. In a filter, the combination with a casing having an inlet tube and a bypass communicating therewith and a port at the lower end of the casing, of a valve mounted between the tube and bypass, a stem extending transversely through the tube and walls of the casing to which said valve is attached, one end of said stem being square in cross section, a valve rod having a square opening for engagement with the squared portion of said stem, a semicylindrical trough attached to one end of said valve rod, a balance weight adjustable on the opposite end of said valve rod, a shaft pivoted to the lower end of said casing, a valve at one end of said shaft adapted to close said port and a rod connecting the opposite end of said shaft to said trough whereby when the trough operates to open or close the first valve, said port will be opened or closed.

2. A filter comprising a casing, an inlet tube for said casing, a bypass communicating with said tube, a flared extension at the upper end of the inlet tube, the lower end of said extension having an inwardly and downwardly extending flange adapted to slightly restrict the passage of water through said extension, a spout communicating with said flared extension adjacent the upper end thereof, a stem extending transversely through the inlet tube adjacent its connection with the bypass, a valve attached to said stem and adapted to open or close the passage to the inlet tube, a valve rod attached to said stem, a trough secured to one end of said rod and positioned below the lower end of said spout whereby when the water arises in the flared extension and descends through said spout into the trough, said valve rod will be tilted and the valve operated, and a balance weight on the opposite end of said rod for swinging the valve in the opposite direction.

In testimony whereof I have signed my name to this specification in the presence of two subscribing witnesses.

SAMUEL F. BOWMAN.

Witnesses:
JOHN E. ROADCAP,
JOHN H. BRIERLEY.

Copies of this patent may be obtained for five cents each, by addressing the "Commissioner of Patents, Washington, D. C."